(12) United States Patent
Lim et al.

(10) Patent No.: US 7,255,194 B2
(45) Date of Patent: Aug. 14, 2007

(54) STEERING SYSTEM FOR A ZERO-STEER VEHICLE

(75) Inventors: Stephen T Lim, Farmington Hills, MI (US); Douglas J Quigley, Rochester, MI (US); Robert Smyczynski, Metamora, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 187 days.

(21) Appl. No.: 11/018,653

(22) Filed: Dec. 21, 2004

(65) Prior Publication Data

US 2006/0131097 A1    Jun. 22, 2006

(51) Int. Cl.
   B62D 7/06    (2006.01)
   B62D 7/09    (2006.01)
(52) U.S. Cl. .................. 180/411; 180/412; 180/414
(58) Field of Classification Search ............... 180/411, 180/412, 413, 414, 415
   See application file for complete search history.

(56) References Cited

U.S. PATENT DOCUMENTS

| | | | | |
|---|---|---|---|---|
| 3,235,283 A * | 2/1966 | De Voghel | .................. | 180/409 |
| 4,823,899 A * | 4/1989 | Ron | ........................... | 180/411 |
| 5,020,627 A | 6/1991 | Wittke | | |
| 5,623,818 A | 4/1997 | Ledbetter | | |
| 5,699,873 A * | 12/1997 | Moriya et al. | ............. | 180/402 |
| 6,354,394 B1 * | 3/2002 | Bauer-Nilsen | ............. | 180/409 |
| 6,732,831 B2 * | 5/2004 | Enmeiji et al. | ............. | 180/411 |
| 2005/0217906 A1 * | 10/2005 | Spark | ......................... | 180/22 |
| 2005/0236217 A1 * | 10/2005 | Koelin et al. | ............... | 180/411 |

* cited by examiner

*Primary Examiner*—Kevin Hurley
(74) *Attorney, Agent, or Firm*—Thomas A. Jurecko

(57) ABSTRACT

A vehicle is provided having a steering system for selectively operating the vehicle in a zero-steer configuration. The system includes a forward steering assembly coupled to a steering wheel and a forward set of wheels. The forward steering assembly is arranged to receive an input from the steering wheel and includes a selectively actuateable forward motorized mechanism. A rear steering assembly is coupled to a rear set of wheels and includes a rearward motorized mechanism. Upon selective activation, the forward motorized mechanism is arranged to engage the forward steering assembly and rotate the forward set of wheels toward a centerline of the vehicle and the rearward motorized mechanism is arranged to engage the rearward steering assembly and rotate the rearward set of wheels toward the vehicle centerline such that the wheels are positioned to allow the vehicle to turn about a central point of the vehicle in a zero-steer configuration.

11 Claims, 11 Drawing Sheets

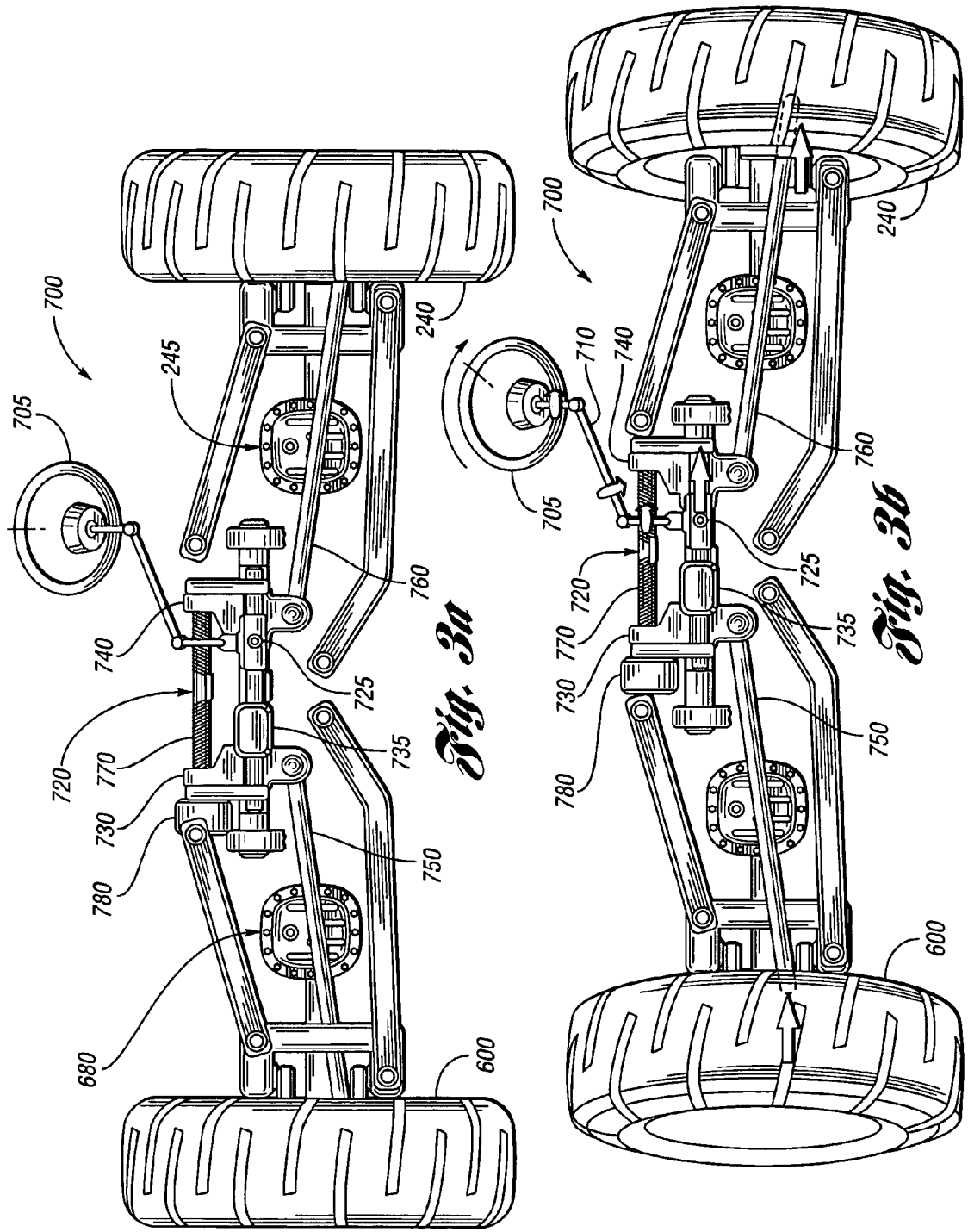

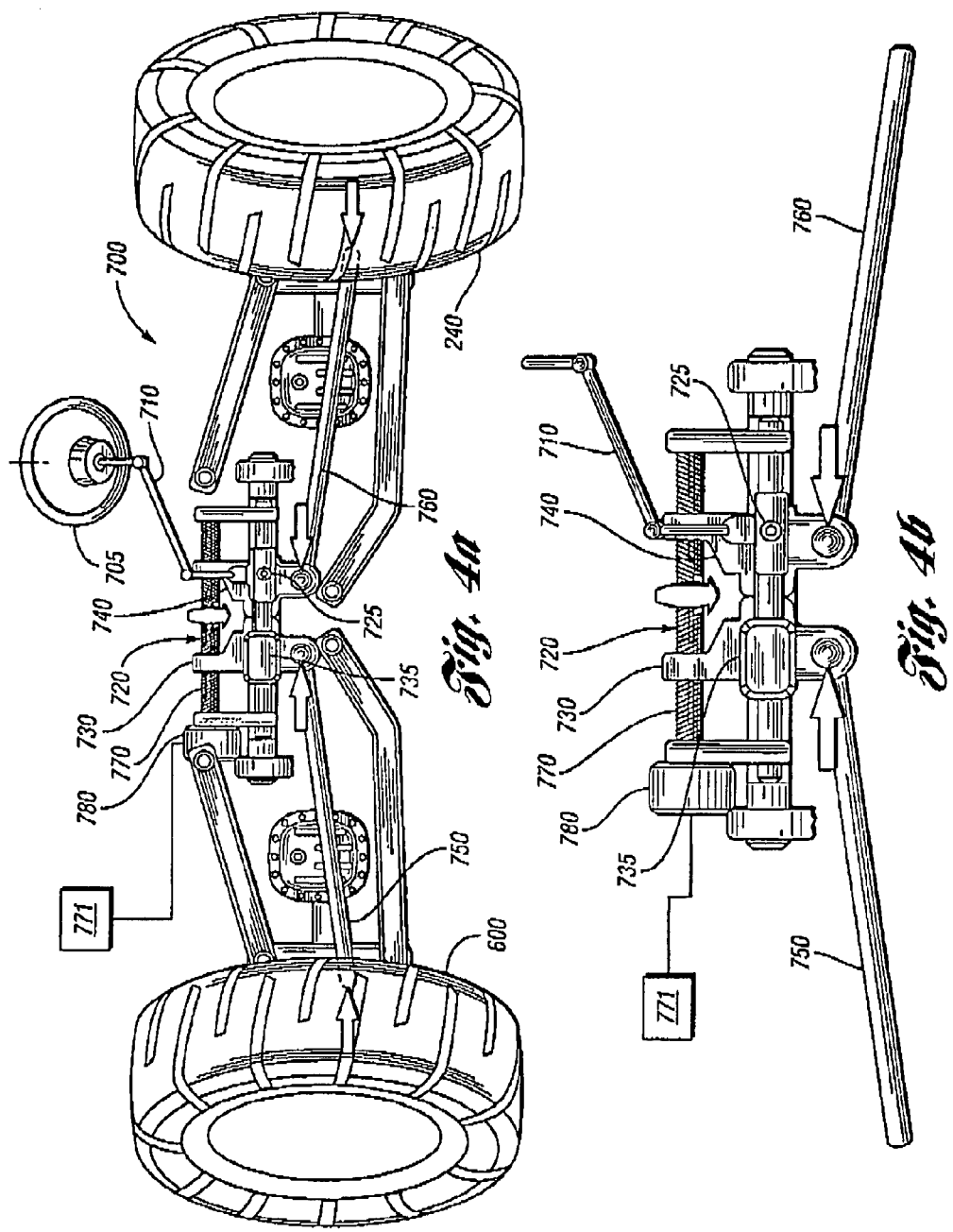

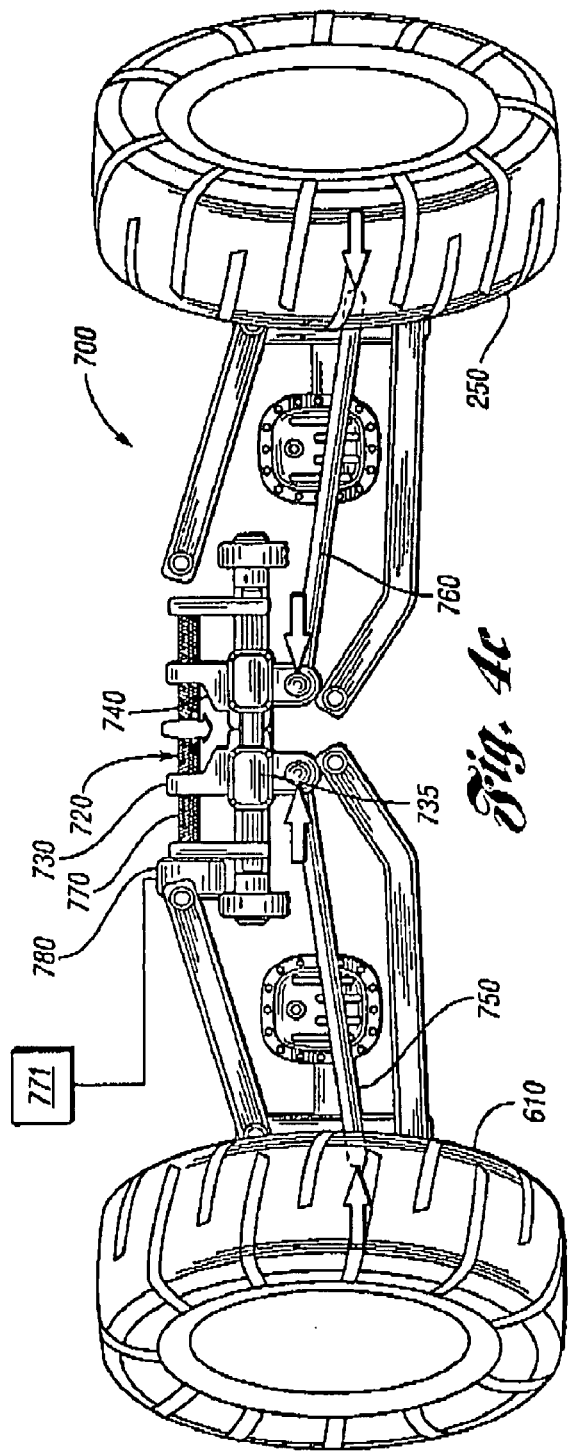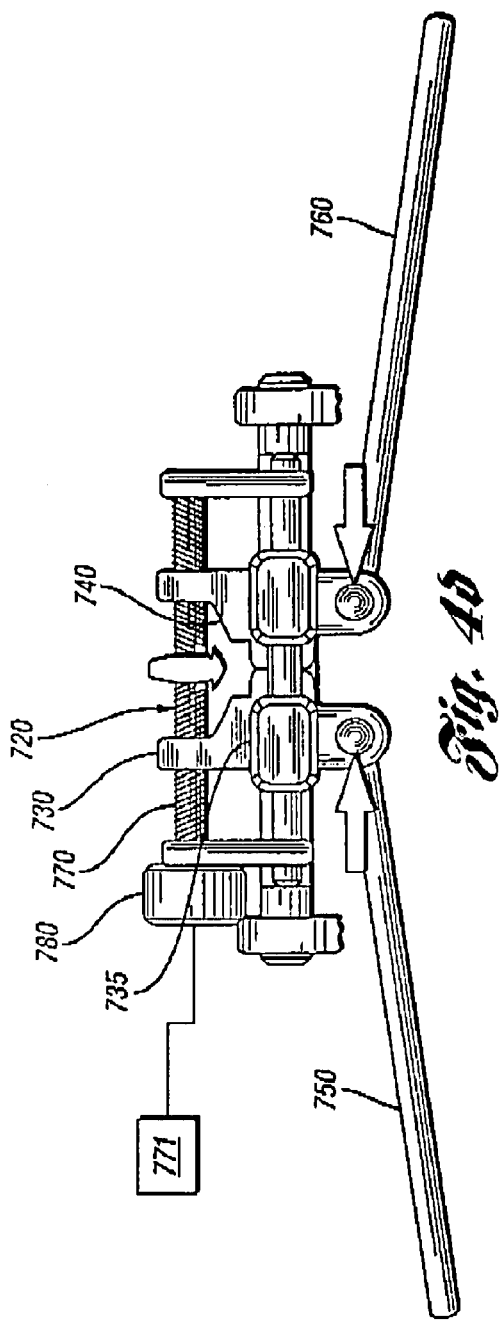

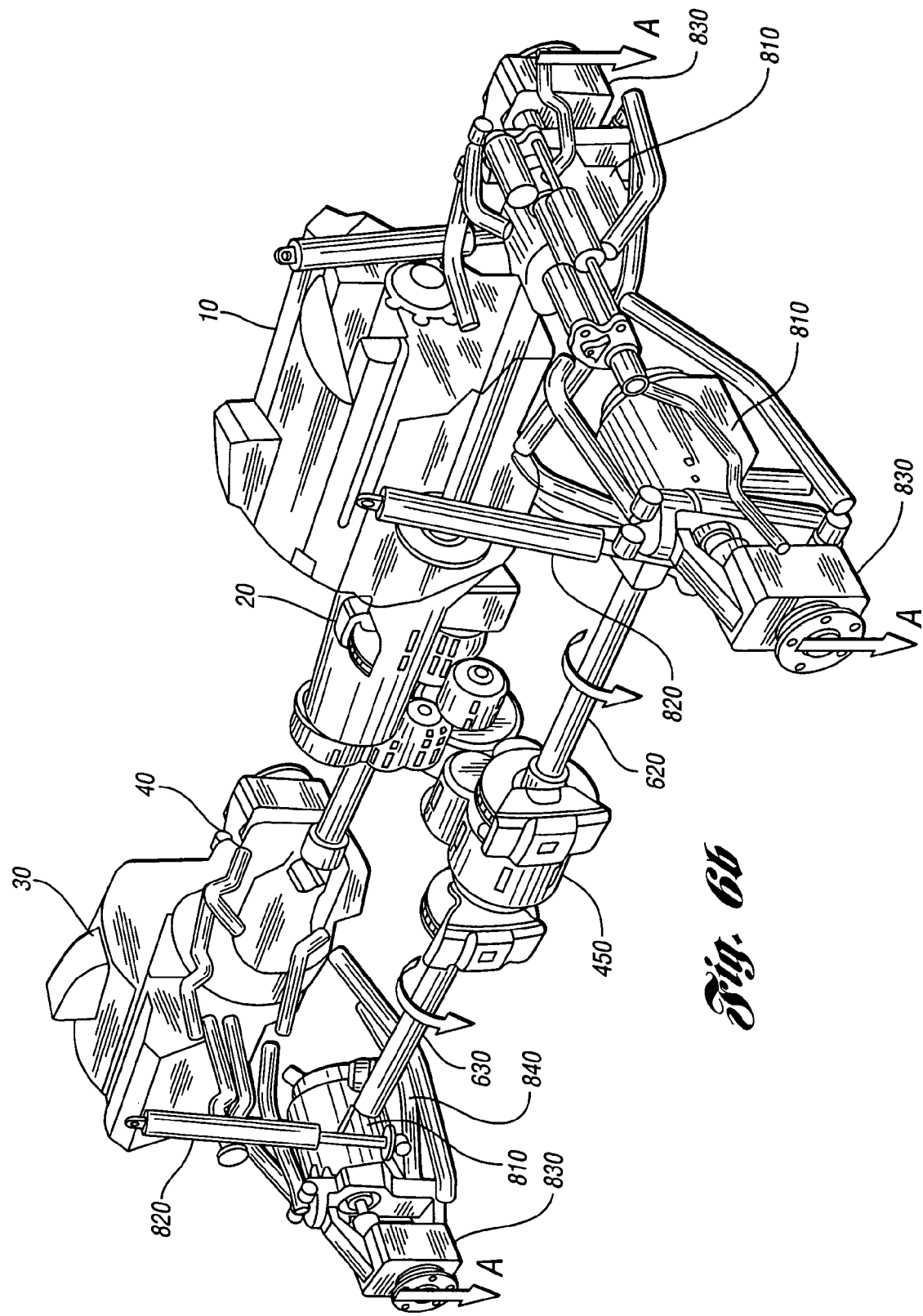

STEERING SYSTEM FOR A ZERO-STEER VEHICLE

FIELD OF INVENTION

The present invention relates generally to steering system arrangement for a vehicle, and, more particularly, to a steering system arrangement for selectively operating the vehicle in a zero-steer configuration.

BACKGROUND OF INVENTION

The sport utility market today includes, among other things, four wheel drive vehicles that are capable of both on-road and off-road navigation. Generally, for off-road driving or utility work-site applications, the more maneuverable a vehicle is, the more capable the vehicle is in handling various types of terrain or obstacles that may be encountered. Features such as ground clearance and suspension travel play a role in the capability of a vehicle for handling off-road work-site terrain.

Often, in off-road maneuvering such as on trails or at a construction site, obstacles are encountered that require a tight turning radius to be able to maneuver around or avoid the obstacle. Sport utility and construction vehicles have improved their turning radius' over the years, but there is still room for improvement as these vehicles still require a sizeable turning radius to maneuver around such objects.

In addition to maneuvering around obstacles or terrain, traction is a key component to maneuverability over or on terrain. Most sport utility and utility vehicles today employ various four wheel drive systems with most having a solid rear axle and a centrally mounted rear differential. The centrally mounted rear differential typically reduces ground clearance and the solid rear axle results in an upward rotative force being applied to one rear tire while a downward rotative lo force is applied to the other rear tire.

Though the previously described vehicle configurations and powertrain systems work for their intended purpose, they also possess certain attributes that detract from their overall utility. Thus, there is a need for an improved powertrain system and vehicle configuration that overcomes the aforementioned and other disadvantages.

SUMMARY OF INVENTION

Accordingly, a steering system for a vehicle is provided for selectively operating the vehicle in a zero-steer configuration.

In accordance with one aspect of the current invention, a forward steering assembly is coupled to a steering wheel and a forward set of wheels. The steering assembly is arranged to receive an input from the steering wheel and includes a selectively actuateable forward motorized mechanism. A rear steering assembly is coupled to a rear set of wheels and includes a rearward motorized mechanism. An actuation mechanism is coupled to the forward motorized mechanism and the rearward motorized mechanism and arranged to selectively engage the motorized mechanisms. Upon selective activation by the actuation mechanism, the forward motorized mechanism is arranged to engage the forward steering assembly and rotate the forward set of wheels toward a centerline of the vehicle and the rearward motorized mechanism is arranged to engage the rearward steering assembly and rotate the rearward set of wheels toward the centerline of the vehicle such that the wheels are positioned to allow the vehicle to turn about a central point of the vehicle in a zero-steer configuration.

In accordance with another aspect of the current invention, the vehicle includes a powertrain system arranged to drive a passenger side set of wheels in an opposite rotation as a driver side set of wheels so as to propel the vehicle in the zero-steer configuration.

BRIEF DESCRIPTION OF DRAWINGS

Other aspects, features, and advantages of the present invention will become more fully apparent from the following detailed description of the preferred embodiment, the appended claims, and in the accompanying drawings in which:

FIG. 3A illustrates a front view of a vehicle having a zero-steer configuration shown in a static position in accordance with the present invention;

FIG. 3B illustrates a front view of a vehicle having a zero-steer configuration shown in a traditional steering mode in accordance with the present invention;

FIG. 4A illustrates a front view of a vehicle having a zero-steer configuration shown in a zero-steer mode of operation in accordance with the present invention;

FIG. 4B illustrates a partial front view of a vehicle having a zero-steer configuration shown in zero-steer mode of operation in accordance with the present invention;

FIG. 4C illustrates a rear view of a vehicle having a zero-steer configuration shown in a zero-steer mode of operation in accordance with the present invention;

FIG. 4D Illustrates a partial rear view of a vehicle having a zero-steer configuration shown in zero-steer mode of operation in accordance with the present invention;

FIG. 6B illustrates a front three-quarter isometric view of a vehicle having a split solid axle arrangement in accordance with the present invention.

DETAILED DESCRIPTION OF EXEMPLARY EMBODIMENT(S)

Figure 1A:
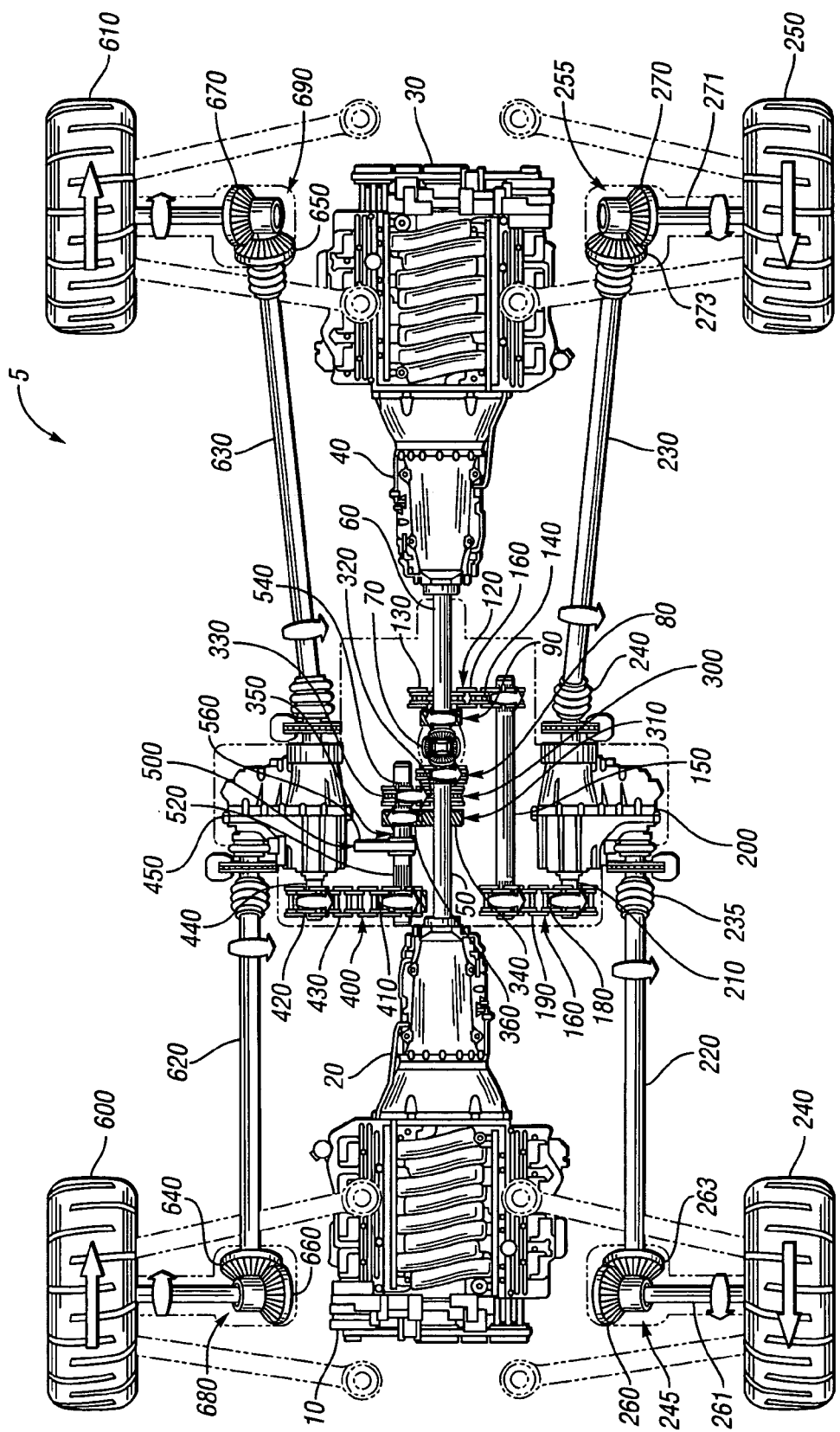
FIG. 1A illustrates a top view of a vehicle having a dual transfer case powertrain arrangement shown in a skid-steer configuration in accordance with the present invention.
Figure 1B:
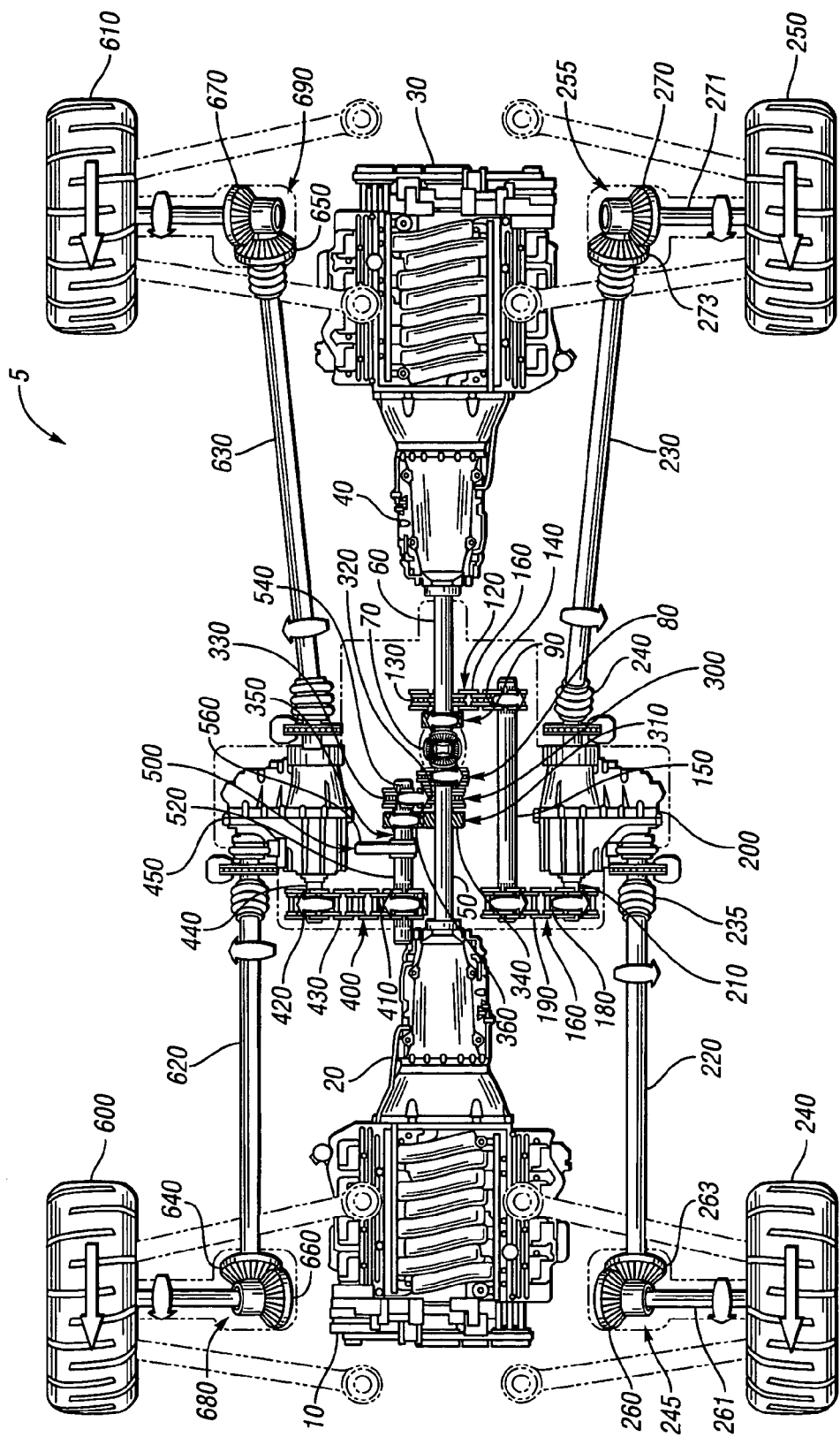
FIG. 1B illustrates a top view of a vehicle having the dual transfer case powertrain arrangement of FIG. 1A and shown in a forward propulsion configuration in accordance with the present invention.
Figure 2:
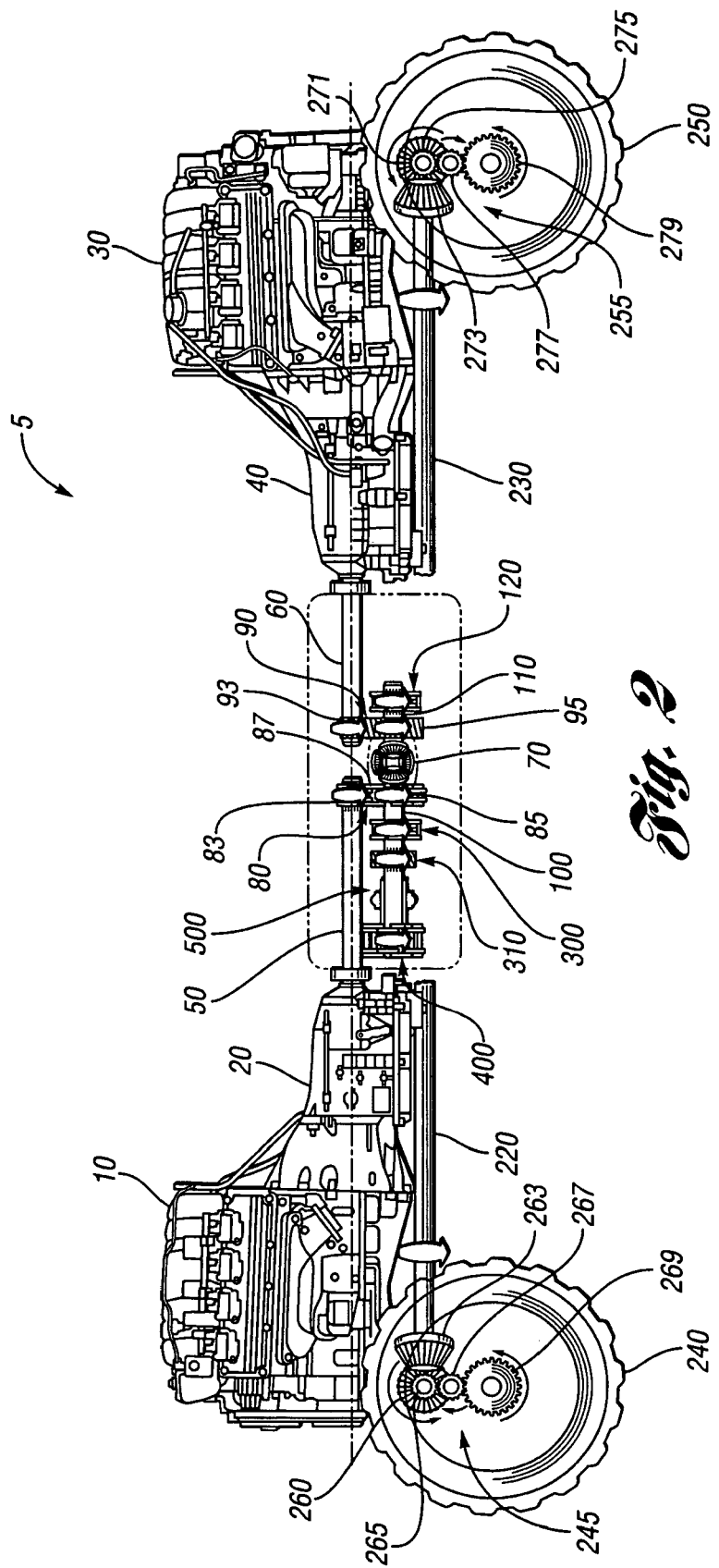
FIG. 2 illustrates a side view of the vehicle of FIG. 1A shown looking from a driver's side perspective in accordance with the present invention.

In the following description, several well-known features of a vehicle powertrain system are not shown or described so as not to obscure the present invention. Referring now to the drawings, FIGS. 1A-1B and 2 illustrate an exemplary embodiment of a vehicle 5 having a powertrain configuration arranged to provide skid-steer capability, and the arrows shown in the Figures denote a direction in which a respective member translates or rotates. In accordance with one aspect of the present invention, a powertrain system is provided including a primary engine assembly 10 with a corresponding primary transmission assembly 20 and a secondary or slave engine assembly 30 with a corresponding secondary transmission assembly 40. Engines 10 and 30 can be of varying displacement and power, but are preferably V-8 engines of the type commonly used in sport utility vehicles. Engine 10 is positioned in a forward area of the vehicle while engine 30 is positioned in a rearward area of the vehicle.

Engine 10 is positioned in a typical manner where transmission 20, when coupled to engine 10, has an output shaft 50 extending towards a rear of the vehicle. Engine 30 is positioned such that transmission output shaft 60 extends towards a front of the vehicle. Transmission output shafts 50 and 60 are coupled to a centrally located, typical differential 70 such as a locking or a limited slip differential as are known in the art. Dual ring gear arrangements 80 and 90 couple transmission output shafts 50 and 60, respectively to the differential 70.

Dual ring gear arrangement 80 has a first chain gear 83 attached to transmission output shaft 50 and a second chain gear 85 attached to locking differential 70 via locking differential output shaft 100. Likewise, dual ring gear arrangement 90 has a first helical gear 93 attached to transmission output shaft 60 and a second helical gear 95 attached to locking differential 70 via locking differential output shaft 110.

Locking differential output shaft 110 is attached at one end to locking differential 70 and second helical gear 95 as described above and at another end to chain gear assembly 120. Chain gear assembly 120 includes a chain gear 130 attached to output shaft 110, chain gear 140 attached to driver side intermediate shaft 150 and chain 160 that couples chain gears 130 and 140 and thus output shaft 110 and intermediate shaft 150 as shown in FIGS. 1A-1B and 2.

Intermediate shaft 150 is coupled to an input shaft 210 of secondary transfer case 200 via chain gear assembly 160. Chain gear assembly 160 includes chain gear 170 attached to intermediate shaft 150, chain gear 180 attached to transfer case input shaft 210 and chain 190 that couples chain gears 170 and 180, respectively and thus intermediate shaft 150 and transfer case input shaft 210.

Transfer case 200, as is known in the art, is used to, among other things, transfer a single torque input to two torque outputs while also selectively providing high and low range operating modes. In this exemplary embodiment, transfer case 200 is used to provide high and low range capability and transfer torque from transfer case input shaft 210 to transfer case output/drive shafts 220 and 230. Drive shafts 220 and 230 are positioned parallel to a wheelbase of vehicle 5 and are coupled to driver side front wheel 240 and driver side rear wheel 250 axle assemblies 245 and 255, respectively. Transfer case output/drive shafts 220 and 230 include typical flexible drive coupling arrangements 235 and 240, such as constant velocity joints as are known in the art.

Front driver side axle assembly 245 includes a 90 degree pinion gear 260 attached to an end of axle shaft 261 and arranged to engage a 90 degree pinion gear 263 attached to an end of transfer case output shaft 220. Attached to an end of pinion gear 260 is a first gear 265 of a three gear portal axle arrangement that transfers torque from pinion gear 260 to wheel 240. In addition to gear 265, the three gear portal axle arrangement includes an intermediate gear 267 and gear 269 attached to an end of axle shaft 261 and arranged to drive a wheel hub 830 (FIG. 6B) for driving wheel 240. It is envisioned that other arrangements besides a three gear portal axle could be utilized to transmit torque from output shaft 220 to wheel 240.

Similarly, rear driver side axle assembly 255 includes a 90 degree pinion gear 270 attached to an end of axle shaft 271 and arranged to engage a 90 degree pinion gear 273 attached to an end of transfer case output shaft 230. Attached to an end of pinion gear 270 is a first gear 275 of a three gear portal axle arrangement that transfers torque from pinion gear 270 to wheel 250. In addition to gear 275, the three gear portal axle arrangement includes an intermediate gear 277 and gear 279 attached to an end of axle shaft 271 and arranged to drive a wheel hub 830 (FIG. 6B) for driving wheel 250. It is envisioned that other arrangements besides a three gear portal axle could be utilized to transmit torque from output shaft 230 to wheel 250.

Locking differential output shaft 100 is attached at one end to locking differential 70 and chain gear 85 and at another end to both a chain gear assembly 300 and a helical gear assembly 310. Gear assemblies 300 and 310 are attached at one end to locking differential shaft 100 and at the other end to primary intermediate shaft assembly 350. Chain gear assembly 300 includes a chain gear 320 attached to shaft 100 and a chain gear 330 slidably attached to shaft assembly 350 and a chain encircling the respective gears. Helical gear assembly 310 includes a helical gear 340 attached to output shaft 100 and a helical gear 360 slidably attached to intermediate shaft 350 and engaged with helical gear 340.

At another end of intermediate shaft 350, chain gear assembly 400 is slidably attached to and rotatably connects intermediate shaft 350 and primary transfer case input shaft 440 of primary transfer case 450. Chain gear assembly 400 includes a chain gear 410 slidably attached to intermediate shaft 350, a chain gear 420 attached to input shaft 440 and a chain 430 that encircles and engages gears 410 and 420.

Transfer case 450, similar to transfer case 200, is utilized to provide high and low range capability and transfer torque from input shaft 440 to passenger side wheels 600 and 610 Through transfer case output/drive shafts 620 and 630, respectively. Attached to each end of output shafts 620 and 630 are 90 degree pinion gears 640 and 650, respectively. Pinion gears 640 and 650 engage 90 degree pinion gears 660 and 670 of driver side front and rear axle assemblies 680 and 690, respectively to drive passenger side front and rear wheels 600 and 610 in the same fashion as driver side axle assemblies 245 and 255 drive front and rear wheels 240 and 250.

Primary intermediate shaft 350 further includes a rotation selection mechanism 500 and splines 520 and 540 positioned relative to gears 410 and 330, 360, respectively. Rotation selection mechanism 500 is envisioned to be any device that can selectively translate shaft 350 in an axial direction and in this exemplary embodiment is a mechanical mechanism comprising a lever 560 that would be accessible from an interior cabin of the vehicle (not shown). Splines 540 are positioned on shaft 350 so as to engage either helical gear 360 or chain gear 330. Splines 520 are positioned on shaft 350 so as to always engage chain gear 410 and transfer torque to transfer case 450 when either gear 330 or gear 360 is engaged by splines 540.

In operation, the unique powertrain layout and rotation selection mechanism of the present invention provides the ability to operate vehicle 5 in a typical forward propulsion configuration or a skid-steer configuration. In a skid-steer mode of operation, as best shown in FIG. 1A, activating lever 540 and sliding shaft 350 axially in a direction toward a rear of the vehicle will engage chain gear assembly 300 through splines 540 engaging gear 330. Engaging gear assembly 300 will transmit torque through intermediate shaft 350 to transfer case 450 in a rotational direction that is the same as transmission output shaft 50 and results in a rotational direction of passenger side transfer case output shafts 620 and 630 that is the same as driver side transfer case output shafts 220 and 230. Thus, passenger side wheels 600 and 610, which are positioned parallel to a wheelbase of vehicle 5, will rotate In a opposite direction as driver side wheels 240 and 250 (also positioned parallel to a wheelbase of vehicle 5) resulting In a skid-steer turning and propulsion arrangement for vehicle 5. Also, in this mode of operation, gear 360 of gearassembly 310 is still rotating, but is rotating freely with respect to shaft 350 as it is not engaged by spllnes 540.

Alternatively, in a forward propulsion mode of operation as best shown in FIG. 1 B, activating lever 540 and sliding shaft 350 in a direction towards a front of the vehicle will engage gear 360 of gear assembly 310 through splines 540. This will transmit torque through shaft 350 to transfer case 450 in a rotational direction opposite of transmission output shaft 50 and results in a rotational direction of passenger side transfer case output shafts 620 and 630 that is the opposite of driver side transfer case output shafts 220 and 230. Thus, passenger side wheels 600 and 610 will rotate in a same direction as driver side wheels 240 and 250 resulting in a forward propulsion arrangement for vehicle 5. Also, in this mode of operation, gear 330 of gear assembly 300 is still rotating, but is rotating freely with respect to shaft 350 as it is not engaged by splines 540.

Thus, when chain gear assembly 300 is engaged by rotation selection mechanism 500, the passenger wheels 600 and 610 will rotate in an opposite direction of driver side wheels 240 and 250. Conversely, when gear assembly 310 is engaged by the selector mechanism, the passenger side wheels will rotate in a direction the same as the driver side wheels.

In accordance with another embodiment of the present invention shown in FIGS. 1A-1B and 2, it is contemplated that vehicle 5 would utilize only one of the two engine/transmission assemblies in providing forward/reverse propulsion and skid-steer capability, namely the primary engine 10 and transmission 20. In this embodiment, engine 30 and corresponding transmission 40 as well as output shaft 60 and gear 90 would not be utilized. Instead, power would be supplied by engine 10 to locking differential 70 and then to differential output shafts 100 and 110, respectively. All other aspects of this embodiment would remain as previously described.

Figure 1C:
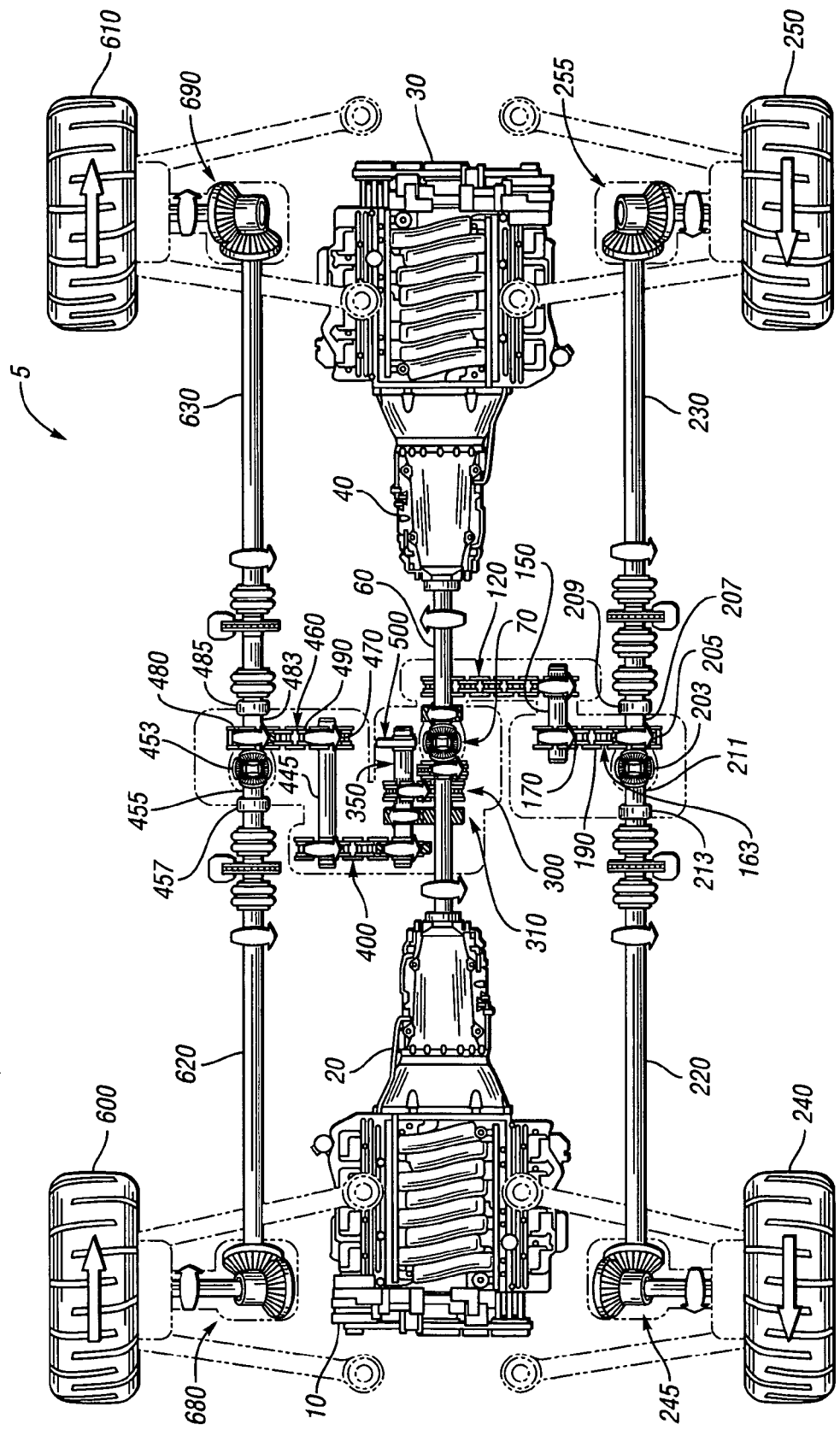
FIG. 1C illustrates a top view of a vehicle having a three differential powertrain arrangement shown in a skid-steer configuration in accordance with the present invention.

In accordance with yet another embodiment of the current invention and referring to FIGS. 1A-1C, dual transfer cases 200 and 450, are replaced with differentials 203 and 453, respectively. This provides for an all-wheel drive mode of operation in place of a four wheel drive with high and low range capability mode of operation. All other aspects of this embodiment are as described for the previously described transfer case embodiment.

Referring to FIG. 1C, differential 203 is coupled to drive shafts 220 and 230. Chain gear assembly 163 couples shaft 150 to differential 203 instead of transfer case 200. Chain gear assembly 163 includes chain gear 170 attached to shaft 150, chain gear 205 attached to differential 203 and chain 190 encircling and coupling gears 170 and 205, respectively. Differential output shaft 207 is coupled to drive shaft 230 via a typical coupling arrangement, such as constant velocity (CV) joint 209, as is known in the art. Likewise, drive shaft 220 is coupled to differential output shaft 211 via a typical coupling arrangement, such as CV joint 213 as shown In FIG. 1C.

On the passenger side of vehicle 5, differential 453 is coupled to drive shafts 620 and 630 as shown in FIG. 1C. Chain gear assembly 400, couples translatable shaft 350 to intermediate shaft 445 instead of transfer case input 10 shaft 440. Intermediate shaft 445 is then coupled to differential output shaft 483 through chain gear assembly 460. Chain gear assembly 460 includes chain gear 470 attached to an end of intermediate shaft 445, chain gear 480 attached to differential 453 and chain 460 encircling and coupling gears 470 and 480, respectively. Output shaft 483 is coupled to drive shaft 630 via a typical coupling arrangement, such as constant velocity (CV) joint 485, as is known in the art. Likewise, drive shaft 620 is coupled to differential output shaft 455 via a typical coupling arrangement, such as CV joint 457.

In accordance with another aspect of the current invention and referring to FIGS. 3A-3C, 4A-4B and 5A-5B, a zero-steer arrangement 700 for vehicle 5 is illustrated. FIGS. 4A-4D and 5A-5B illustrate a zero-steer configuration for front wheels 240 and 600 and rear wheels 250 and 610, respectively, and the arrows In FIGS. 3A-3C, 4A-4D and 5A-5B denote a direction in which a respective member translates or rotates. Referring now to FIGS. 3A-3C, the zero-steer arrangement 700 is shown in a traditional steering mode. The zero-steer arrangement Includes, among other things, a steering wheel 705 and a steering shaft 710 connecting the steering wheel to the zero-steer rack and pinion steering assembly 720. Steering assembly 720 includes a rack and pinion assembly 725, a power assist unit 735, and steering arms 730 and 740 coupled to steering arms 750 and 760 which are in turn coupled to wheels 600 and 240, respectively as Is known in the art. Zero-steer rack and pinion steering assembly further includes a worm gear 770 coupled to steering arms 730 and 740 and an auctuatable motor 780 coupled to and arranged to rotate worm gear 770. In a traditional steering mode, as best shown in FIGS. 3B and 3C, when steering wheel 705 is turned in the direction indicated, steering arms 730 and 740 including the worm gear 770 and the motor 780, move together as one unit rotating each wheel in a typical manner. Contrariwise, when zero-steer capability is desired, front wheels 240 and 600 will not move as one unit and will in fact each rotate in a direction towards a center of the vehicle as best shown in FIGS. 4A and 4B.

Figure 5A:
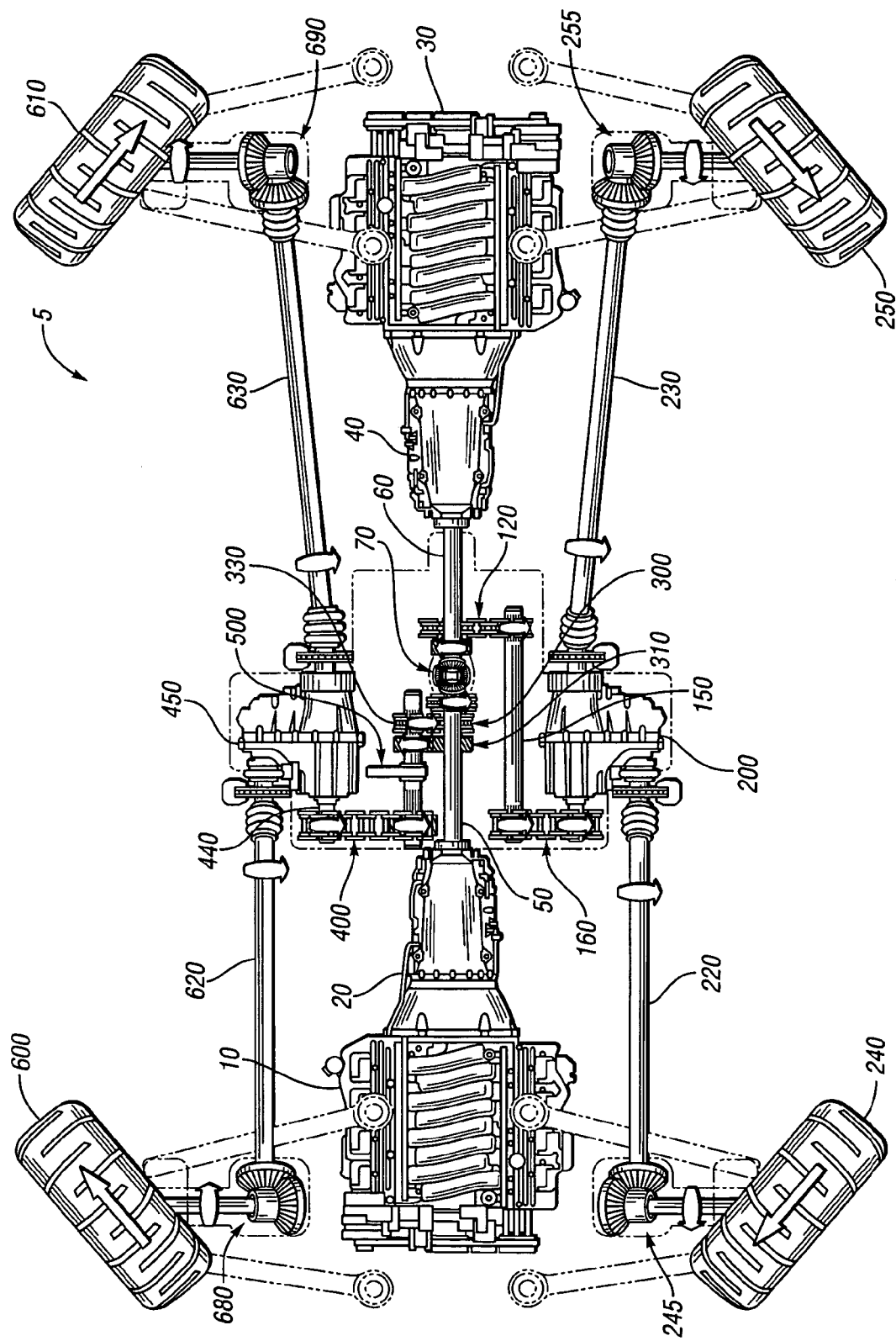
FIG. 5A illustrates a top view of a vehicle having a dual transfer case powertrain arrangement shown in a zero-steer configuration in accordance with the present invention.

In a zero-steer mode of operation, the rear wheels 250 and 610 (FIGS. 1A-1B, 4C, and 4D) will move in the same fashion as described below for front wheels 240 and 600. More specifically, the same zero-steer arrangement 700 will also be used for the rear wheels 250, 610, but without steering wheel 705, steering shaft 710 and rack and pinion assembly 725. The process for activating zero steer for both the front and rear wheels will now be described based on the front zero steer arrangement 700. To activate zero steer, an actuation mechanism 771 would be provided In the vehicle's interior cabin (not shown) to actuate motor 780. Once actuated, motor 780 would rotate worm gear 770 and this in turn draws steering arms 730 and 740 towards a center of the vehicle. Drawing steering arms 730 and 740 towards a center of the vehicle rotates front wheel 600 and front wheel 240 inward via steering rods 750 and 760 as best shown in FIGS. 4A and 4C. Simultaneous with the front wheels 240, 600, activating zero-steer from the interior cabin would perform the same operation on rear wheels 250 and 610 resulting in a zero-steer wheel configuration as best shown in FIGS. 4C and 5A. In addition, the rotation selection mechanism 500 would be positioned so as to engage chain drive assembly 300 and thus rotate passenger wheels 600 and 610 in a direction opposite of driver side wheels 240 and 250 as previously described. Thus, in a zero-steer configuration, vehicle 5 can turn about a central point of the vehicle while being propelled by each vehicle tire without any skidding of the tires as shown in FIG. 5A.

Figure 5B:
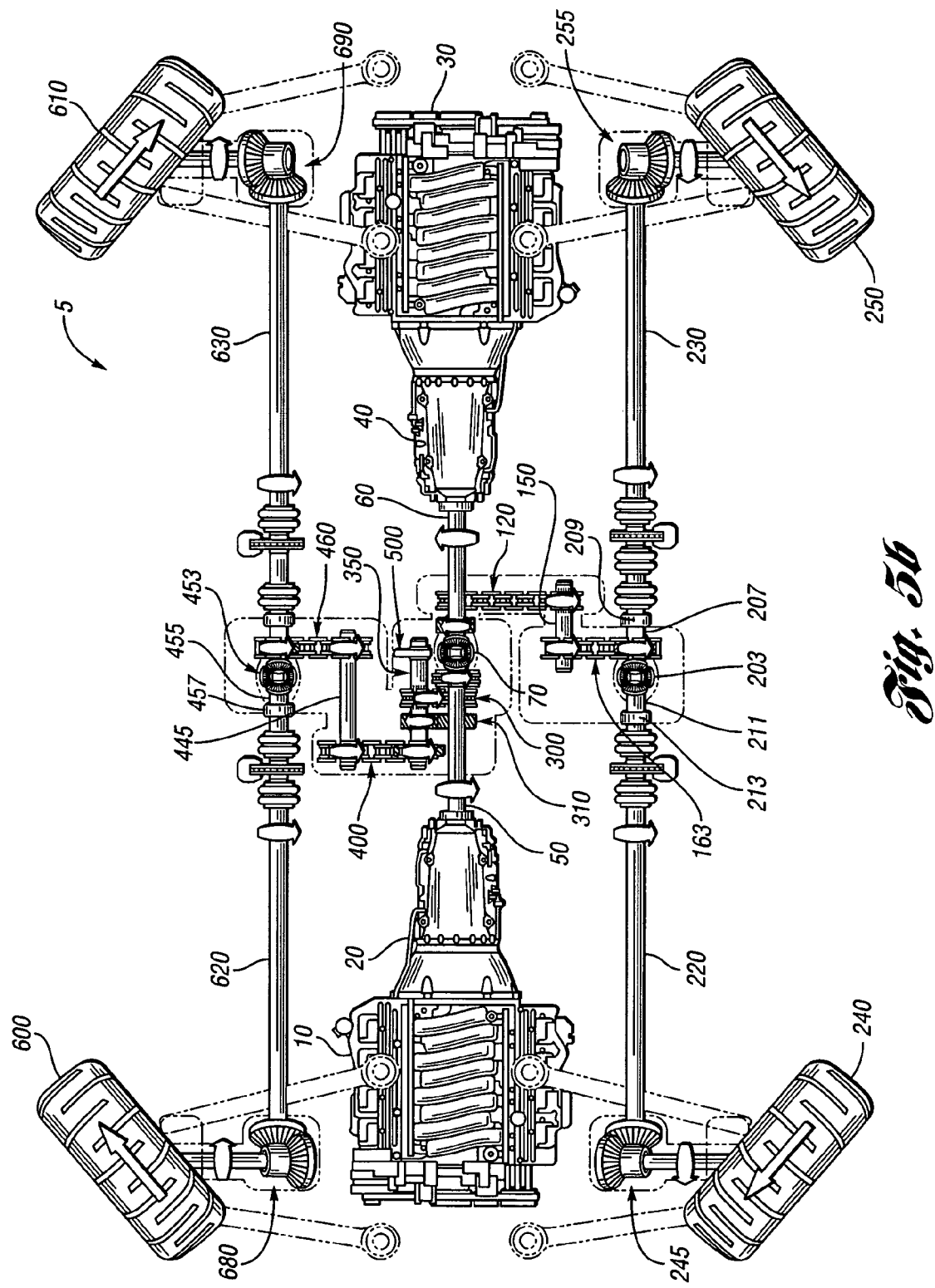
FIG. 5B illustrates a top view of a vehicle having a three differential powertrain arrangement shown in a zero-steer configuration in accordance with the present invention.

In accordance with another embodiment of the present invention, dual transfer cases 200 and 450 are replaced with differentials 203 and 453, respectively and utilized in the zero-steer configuration. Referring to FIGS. 5A, 5B and 1C, vehicle 5 is provided in a zero-steer configuration using differentials 203 and 453 in place of the transfer cases as best shown in FIG. 5B. The powertrain functionality of vehicle 5 in a zero-steer configuration (FIG. 5B) is the same as vehicle 5 in a skid-steer configuration (FIG. 1C) and FIG. 1C uses the same reference numerals for the same components that are identified in FIG. 1B. Thus, as with the all wheel drive skid-steer configuration, using differential in place of transfer cases provides an all wheel drive powertrain arrangement for the zero-steer configuration as well.

In accordance with another embodiment of The present invention and referring to FIGS. 6A-6B, a split solid axle design is provided and the arrows In FIGS. 6A-6B denote a direction in which a respective member translates or rotates and/or a resultant force is generated as described in more detail below. In traditional sport utility vehicles with four wheel drive capability, a solid axle design with a central differential is often utilized for the rear and also the front wheels. With this design ground clearance is limited by having the centrally mounted differential. Also, with a solid rear axle, a drive shaft typically provides torque to the differential and then the differential distributes torque to the driver and passenger rear wheels. One drawback of this design is that a downward rotational force is applied to one rear tire while an upward rotational force is applied to the other rear tire as is known In the art. In general, the driveshaft applies a rotational force to the differential that has a result of attempting to rotate the differential in a cross car direction and Thus an upward force to one end of the axle and a downward force to another end of the axle. This can often be observed by watching a pick-up sport utility vehicle initially accelerate from a stop. Upon initial acceleration, the bed can be observed to twist or rotate slightly from one side to The other with respect to the ground.

The present invention of a split solid axle provides a downward rotational force for each tire by eliminating central differentials and having a driveshaft for each vehicle wheel. The split solid axle design is the same for front wheels 240 and 600 and rear wheels 250 and 610 and thus like reference numerals will be used for each split solid axle and one wheel, the driver front wheel 240, will be described. The split solid axle design includes a split solid axle housing 810 that houses the 90 degree pinion gear 263 attached to an end of drive shaft 220 and the mating 90 degree pinion gear 260 attached to an end of axle 261. The split solid axle does not span across the vehicle and does not include a differential as shown in FIGS. 6A-6B. A typical independent suspension assembly 820 is mounted to control arms 840 as shown in FIG. 6A-6B.

Figure 6A:
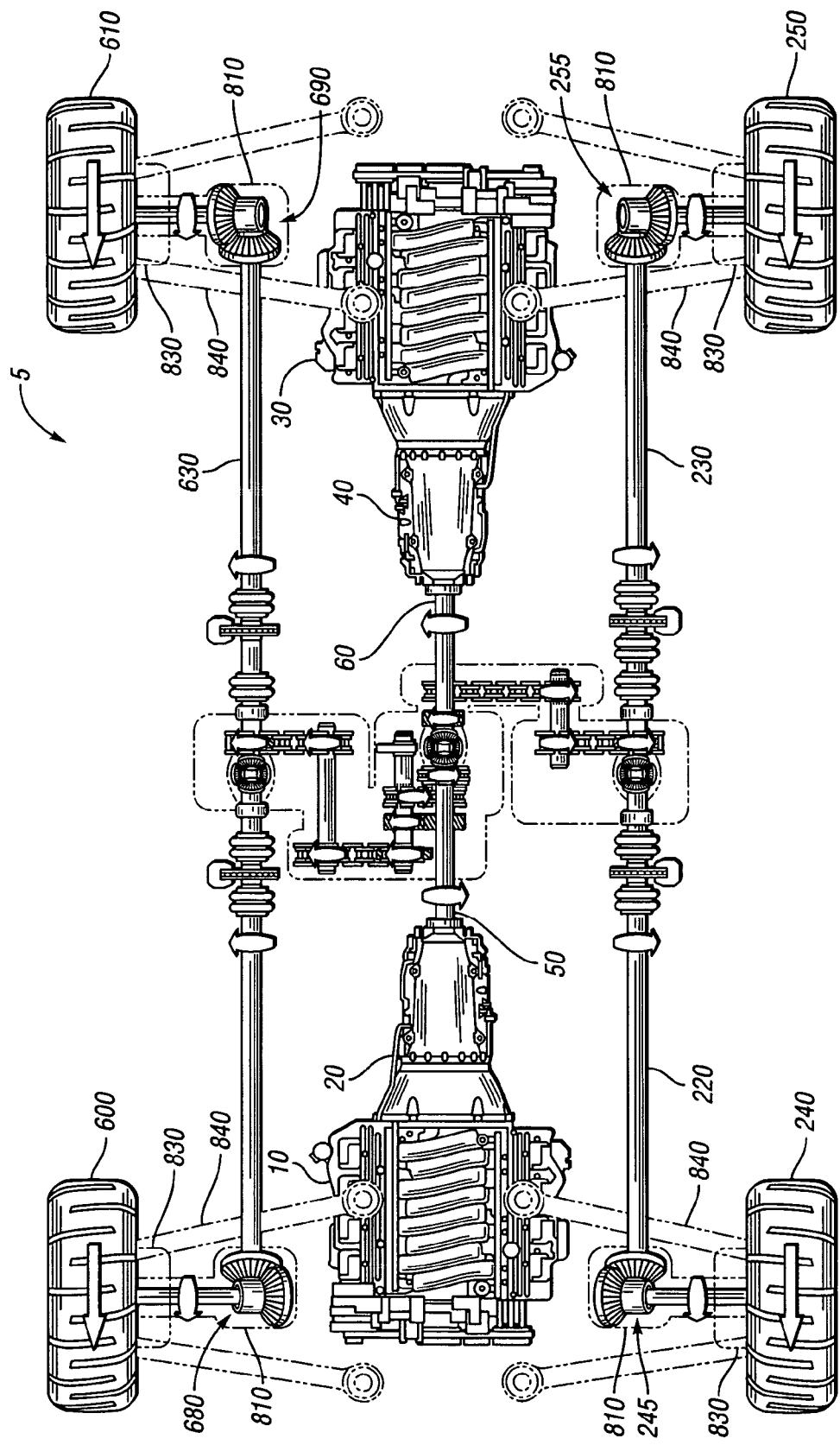
FIG. 6A illustrates a top view of a vehicle having a split solid axle arrangement shown in a forward propulsion configuration in accordance with the present invention.

Referring to the arrows in FIGS. 6A-6B, the rotation of the drive shafts and axle shafts result in a downward force in the direction of arrow A being applied to each tire. More specifically, as drive shaft 220 rotates towards tire 240, this imparts a twisting force on axle 261 at the pinion gear end. The twisting force creates a moment arm along axle 261 with a resulting downward force being imparted on tire 240. By splitting the solid axle as in the present invention and arranging the drive shafts for each wheel such that the downward force rotation will always be applied to the wheel in use, the negative aspect of the upward rotation force of one wheel of a conventional solid axle does not come into play.

The foregoing description constitutes the embodiments devised by the inventors for practicing the invention. It should be noted that several different aspects of the present invention have been provided and the zero-steer, skid-steer and split solid axle are inventions that can be practiced independent of each other. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A vehicle having a steering system, the steering system comprising:
  a forward steering assembly coupled to a steering wheel and a forward set of wheels, the forward steering assembly arranged to receive an input from the steering wheel and rotate the forward set of wheels, the forward steering assembly including a selectively actuateable forward motorized mechanism;
  a rearward steering assembly coupled to a rear set of wheels and including a selectively acutateable rearward motorized mechanism; and
  an actuation mechanism coupled to the forward motorized mechanism and the rearward motorized mechanism and arranged to selectively engage the motorized mechanisms;
  wherein upon selective activation by the actuation mechanism, the forward motorized mechanism is arranged to engage the forward steering assembly and rotate the forward set of wheels toward a centerline of the vehicle and the rearward motorized mechanism is arranged to engage the rearward steering assembly and rotate the rearward set of wheels toward the centerline of the vehicle such that the wheels are positioned to allow the vehicle to turn about a central point of the vehicle in a zero-steer configuration; and
  wherein the forward steering assembly comprises a forward rack and pinion steering assembly and the rearward steering assembly comprises a rearward rack and pinion steering assembly.

2. The steering system arrangement of claim 1, wherein the forward rack and pinion steering assembly further includes a forward pair of steering arms, each steering arm of the forward pair of steering arms coupled to a respective front wheel of the set of front wheels, and wherein the rearward rack and pinion steering assembly further includes a rearward pair of steering arms, each steering arm of the rearward pair of steering arms coupled to a respective rear wheel of the set of rear wheels.

3. The steering system arrangement of claim 2, wherein the forward motorized mechanism comprises a worm gear coupled to a motor and the forward pair of steering arms such that upon selective actuation, the motor rotates the worm gear and rotates the front set of wheels toward a centerline of the vehicle; and wherein the rearward motorized mechanism comprises a worm gear coupled to a motor and the rearward pair of steering arms such that upon selective actuation, the motor rotates the worm gear and rotates the rear set of wheels toward the centerline of the vehicle such that the vehicle will turn about a central point of the vehicle in a zero-steer configuration.

4. The steering system arrangement of claim 2, further comprising a tie rod coupled to each of the forward and rearward steering arms at one end and each of the forward and rearward wheels at another end.

5. The steering assembly arrangement of claim 1, wherein the actuation mechanism comprises a switch assembly positioned in an interior of a vehicle.

6. A vehicle having a zero-steer arrangement, the arrangement comprising:
    a forward steering assembly coupled to a steering wheel and a forward set of wheels of the vehicle, the forward steering assembly arranged to receive an input form the steering wheel and rotate the forward set of wheels and including a selectively actuateable forward motorized mechanism;
    a rearward steering assembly coupled to a rear set of wheels and including a selectively acutateable rearward motorized mechanism;
    an actuation mechanism coupled to the forward motorized mechanism and the rearward motorized mechanism and arranged to selectively engage the motorized mechanisms; and
    a powertrain system arranged to selectively drive a passenger side set of wheels in one of a same direction and an opposite direction as a driver side set of wheels;
    wherein, upon selective actuation, the forward motorized mechanism is arranged to engage the forward steering assembly and rotate the forward set of wheels toward a centerline of the vehicle and the rearward motorized mechanism is arranged to engage the rearward steering assembly and rotate the rearward set of wheels toward the centerline of the vehicle such that the wheels are positioned to allow the vehicle to turn about a central point of the vehicle in a zero-steer configuration, and wherein the powertrain arrangement is selectively actuated to drive the passenger side set of wheels in an opposite rotation as the driver side set of wheels to propel the vehicle in the zero-steer configuration; and
    wherein the forward steering assembly comprises a forward rack and pinion steering assembly and the rearward steering assembly comprises a rearward rack and pinion steering assembly.

7. The vehicle of claim 6, wherein the actuation mechanism comprises a switch assembly positioned in an interior of a vehicle.

8. The vehicle of claim 6, wherein the actuation mechanism is arranged to engage the forward and rearward motorized mechanisms when the powertrain system is selectively actuated to drive the passenger side set of wheels in an opposite rotation as the driver side set of wheels.

9. The steering system arrangement of claim 6, wherein the forward rack and pinion steering assembly further includes a forward pair of steering arms, each steering arm of the forward pair of steering arms coupled to a respective front wheel of the set of front wheels, and wherein the rearward rack and pinion steering assembly further includes a rearward pair of steering arms, each steering arm of the rearward pair of steering arms coupled to a respective rear wheel of the set of rear wheels.

10. The steering system arrangement of claim 9, wherein the forward motorized mechanism comprises a worm gear coupled to a motor and the forward pair of steering arms such that upon selective actuation, the motor rotates the worm gear and rotates the front set of wheels toward a centerline of the vehicle; and wherein the rearward motorized mechanism comprises a worm gear coupled to a motor and the rearward pair of steering arms such that upon selective actuation, the motor rotates the worm gear and rotates the rear set of wheels toward the centerline of the vehicle such that the vehicle will turn about a central point of the vehicle in a zero-steer configuration.

11. The steering system arrangement of claim 10, further comprising a tie rod coupled to each of the forward and rearward steering arms at one end and each of the forward and rearward wheels at another end.

* * * * *